United States Patent
Hasuike et al.

(10) Patent No.: US 12,398,252 B2
(45) Date of Patent: Aug. 26, 2025

(54) MEMBER FOR COMPOSITE MATERIAL, COMPOSITE MATERIAL, MOBILE BODY, AND METHOD FOR MANUFACTURING FILM FOR COMPOSITE MATERIAL

(71) Applicant: Mitsubishi Chemical Corporation, Tokyo (JP)

(72) Inventors: Masayasu Hasuike, Tokyo (JP); Hikari Wakita, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 358 days.

(21) Appl. No.: 17/848,586

(22) Filed: Jun. 24, 2022

(65) Prior Publication Data
US 2022/0325054 A1 Oct. 13, 2022

Related U.S. Application Data

(63) Continuation of application No. PCT/JP2020/048321, filed on Dec. 24, 2020.

(30) Foreign Application Priority Data

| Dec. 27, 2019 | (JP) | ................................ | 2019-237638 |
| Jun. 3, 2020 | (JP) | ................................ | 2020-096903 |
| Jun. 3, 2020 | (JP) | ................................ | 2020-096904 |

(51) Int. Cl.
*C08J 5/18* (2006.01)
*B29C 48/00* (2019.01)
(Continued)

(52) U.S. Cl.
CPC .............. *C08J 5/18* (2013.01); *B29C 48/022* (2019.02); *B29C 48/08* (2019.02); *C08J 5/24* (2013.01);
(Continued)

(58) Field of Classification Search
CPC ... C08G 8/00; C08G 8/02; C08G 8/04; C08G 8/26; C08L 61/00; C08L 61/02;
(Continued)

(56) References Cited

U.S. PATENT DOCUMENTS

| 4,942,216 A | 7/1990 | Heinz et al. |
| 2011/0003163 A1 | 1/2011 | Wood |

(Continued)

FOREIGN PATENT DOCUMENTS

| CN | 101215404 A | 7/2008 |
| CN | 107778503 A | 3/2018 |

(Continued)

OTHER PUBLICATIONS

Machine Translation of JP 2007-269308 (Year: 2007).*
(Continued)

*Primary Examiner* — Zachary M Davis
(74) *Attorney, Agent, or Firm* — Morgan, Lewis & Bockius LLP

(57) ABSTRACT

The following is provided as a member for a composite material that has excellent durability, impact resistance, and productivity. A member for a composite material containing a resin component that contains polyaryletherketone as a main component. The resin component has a molecular weight distribution of 2 or more and less than 4 and a mass average molecular weight of 63000 or more. The composite material contains a resin and reinforcing fibers having a number average fiber length of 5 mm or more.

25 Claims, 1 Drawing Sheet

(51) Int. Cl.
  *B29C 48/08* (2019.01)
  *C08J 5/24* (2006.01)
  *B29K 71/00* (2006.01)

(52) U.S. Cl.
  CPC ....... *B29K 2071/00* (2013.01); *C08J 2361/02* (2013.01)

(58) Field of Classification Search
  CPC .......... C08L 61/04; C08L 61/06; C08L 61/16; C08L 61/18
  See application file for complete search history.

(56) References Cited

U.S. PATENT DOCUMENTS

| | | | |
|---|---|---|---|
| 2011/0178237 A1 | | 7/2011 | Ono et al. |
| 2012/0100365 A1 | * | 4/2012 | Mutsuda .................. C08L 71/00 428/332 |
| 2014/0008843 A1 | | 1/2014 | Mutsuda |

FOREIGN PATENT DOCUMENTS

| | | | |
|---|---|---|---|
| EP | 3760666 A1 | | 1/2021 |
| EP | 3816212 A1 | | 5/2021 |
| EP | 3957687 A1 | | 2/2022 |
| JP | S62-115033 A | | 5/1987 |
| JP | H02-004828 A | | 1/1990 |
| JP | 2007269308 A | * | 10/2007 |
| JP | 2010-095613 A | | 4/2010 |
| JP | 2011-513529 A | | 4/2011 |
| JP | 2014-173005 A | | 9/2014 |
| JP | 2014-210940 A | | 11/2014 |
| JP | 2019-034392 A | | 3/2019 |
| JP | 2019-046980 A | | 3/2019 |
| JP | 2019-147876 A | | 9/2019 |
| WO | 2009/057255 A1 | | 5/2009 |

OTHER PUBLICATIONS

Extended European Search Report issued in counterpart European Patent Application No. 20905725.6 dated Jan. 9, 2023.
International Search Report issued in corresponding International Patent Application No. PCT/JP2020/048321 dated Mar. 30, 2021.
International Preliminary Report on Patentability and Written Opinion issued in corresponding International Patent Application No. PCT/JP2020/048321 dated Jul. 7, 2022.
Office Action issued in Chinese Patent Application No. 202080090277.1 dated Aug. 31, 2023.
Office Action issued in corresponding Chinese Patent Application No. 202080090277.1 dated Jul. 31, 2024.
K.A. Laux et al. "Effects of contact pressure, molecular weight, and supplier on the wear behavior and transfer film of polyetheretherketone (PEEK)"; Wear 297 (2013) 919-925; www.elsevier.com/locate/wear.
Office Action issued in corresponding Japanese Patent Application No. 2020-214414, dated Jan. 28, 2025.
Office Action issued in corresponding Japanese Patent Application No. 2021-024323, dated Jan. 28, 2025.
Office Action issued in corresponding Japanese Patent Application No. 2021-024324, dated Jan. 28, 2025.
Chengdu University of Science and Technology et al., "Polymer Physics," Industry Publishing House, Jan. 1981, p. 18 (2 pages) (see the English translation of the Chinese Office Action).
Zhigao et al., "Plastic Molding Process and Mold Design," Machine Industry Publishing House, ISBN 978-7-111-27766-8, Aug. 2009, p. 25 (2 pages) (see the English translation of the Chinese Office Action).
Decision of Refusal issued in corresponding Chinese Patent Application No. 202080090277.1, dated Feb. 19, 2025.
Search Report issued in corresponding Chinese Patent Application No. 202080090277.1, dated Feb. 19, 2025.

* cited by examiner

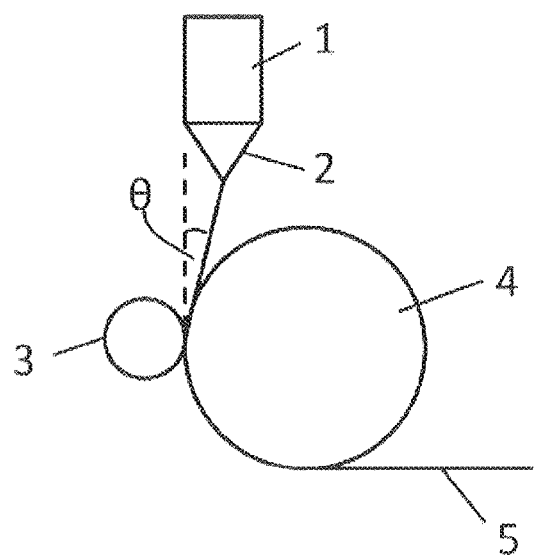

MEMBER FOR COMPOSITE MATERIAL, COMPOSITE MATERIAL, MOBILE BODY, AND METHOD FOR MANUFACTURING FILM FOR COMPOSITE MATERIAL

RELATED APPLICATIONS

This application is a continuation of International Application No. PCT/JP2020/048321, filed on Dec. 24, 2020, which claims priority to Japanese Patent Application No. 2019-237638, filed on Dec. 27, 2019, and Japanese Patent Application Nos. 2020-096903 and 2020-096904, filed on Jun. 3, 2020, the entire contents of each of which being herein incorporated by reference.

TECHNICAL FIELD

The present disclosure relates to a member for a composite material that is constituted by polyaryletherketone and is applicable to composite materials used in electrical or electronic devices, automobiles, airplanes, and the like, and also relates to a composite material and a mobile body in which the member for a composite material is used. The present disclosure also relates to a method for manufacturing a film for a composite material.

BACKGROUND ART

In recent years, super engineering plastics represented by polyetheretherketone (PEEK), polyetherimide sulfone (PEI), polyethersulfone (PES), polyether ketone (PEK), polyether ketone ketone (PEKK), polyether ketone ether ketone ketone (PEKEKK), and the like have been widely adopted for films used in electrical or electronic devices, automobiles, airplanes, and the like because the super engineering plastics have high heat resistance, mechanical properties, chemical resistance, and durability.

In particular, polyetheretherketone has excellent heat resistance, mechanical properties, chemical resistance, and the like, and therefore is used as a matrix material for fiber-reinforced materials. In order to sufficiently exhibit these properties, resin needs to be crystallized, but there is a problem in that durability and impact resistance decrease if the degree of crystallinity is too high, and further improvements in these physical properties are desired in cases where resin is used in fiber-reinforced materials.

PTL 1 discloses a composite material that contains polyetheretherketone as a matrix and fibers sized with polyethersulfone as a reinforcing material. PTL 2 discloses a fiber-reinforced thermoplastic resin prepreg in which a polyaryl ketone resin composition having a specific intrinsic viscosity is used.

RELATED ART DOCUMENTS

Patent Documents

PTL 1: JP-A-SHO62(1987)-115033
PTL 2: JP-A-2019-147876

SUMMARY

However, the inventors found through examination that the polyetheretherketone described in PTL 1 has a low molecular weight, and therefore, durability and impact resistance are insufficient for usage of the composite material as a fiber-reinforced composite material. Also, the inventors found through examination that the polyaryl ketone described in PTL 2 has an excessively wide molecular weight distribution and therefore, when producing a member for a composite material, a problem in productivity arises, the crystallinity of the obtained member for a composite material becomes too high, and problems in durability and impact resistance may arise depending on the method of use. The inventors also found through examination that if the folding endurance (a number of times of folding endurance) of a member such as a film used in the composite material is increased in order to obtain a composite material that has excellent durability, the composite material can be suitably used in applications for which high durability is required, such as applications in which stress is repeatedly applied.

The present disclosure was made under the above circumstances, and provides a member for a composite material and the like that has excellent durability and impact resistance, and also has excellent productivity while maintaining heat resistance that is intrinsic to polyaryletherketone.

As a means for solving the problems of conventional art described above, the present disclosure provides a member for a composite material and the like in which polyaryletherketone having a specific molecular weight distribution and a specific molecular weight is used.

That is, the present disclosure provides the following [1] to [25].

[1] A member for a composite material, containing a resin component that contains polyaryletherketone as a main component, wherein the resin component has a molecular weight distribution of 2 or more and less than 4 and a mass average molecular weight of 63000 or more, and wherein the composite material contains a resin and reinforcing fibers having a number average fiber length or 5 mm or more.

[2] The member for a composite material according to [1], wherein the polyaryletherketone is polyetheretherketone.

[3] The member for a composite material according to [1] or [2], wherein a percentage of the content of polyaryletherketone in the resin component is more than 90 mass %.

[4] The member for a composite material according to any one of [1] to [3], wherein the resin component has the mass average molecular weight of 150000 or less.

[5] The member for a composite material according to any one of [1] to [4], wherein the polyaryletherketone has a molecular weight distribution of 2 or more and less than 4 and a mass average molecular weight of 63000 or more.

[6] The member for a composite material according to any one of [1] to [5], wherein the polyaryletherketone has the mass average molecular weight of 150000 or less.

[7] The member for a composite material according to any one of [1] to [6], wherein the member has a crystal heat of fusion of 30 J/g or more and 45 J/g or less.

[8] The member for a composite material according to any one of [1] to [7], wherein the member has a number of times of folding endurance of 5000 or more when measured under conditions of: a thickness of 100 μm, a folding angle of 135°, a folding speed of 175 cpm, and a load of 9.8 N.

[9] The member for a composite material according to any one of [1] to [8], wherein a puncture impact strength of the member is 0.3 J or more when measured under conditions of: a thickness of 100 μm, 23° C., a fixing frame inner diameter of 50 mm, a punching striker diameter of 12.7 mm, and a test speed of 3 m/second.

[10] The member for a composite material according to any one of [1] to [9], wherein the puncture impact strength of the member is 0.3 J or more when measured under conditions of: a thickness of 100 μm, −20° C., a fixing frame inner diameter of 50 mm, a punching striker diameter of 12.7 mm, and a test speed of 3 m/second.

[11] The member for a composite material according to any one of [1] to [10], wherein the member has a thickness accuracy of 7% or less.

[12] The member for a composite material according to any one of [1] to [11], wherein at least one surface of the member has an arithmetic mean height of 0.001 to 1 μm.

[13] The member for a composite material according to any one of [1] to [12], wherein at least one surface of the member has a maximum height of 0.1 to 10 μm.

[14] The member for a composite material according to any one of [1] to [13], wherein at least one surface of the member has an arithmetic mean roughness of 0.005 to 1 μm.

[15] The member for a composite material according to any one of [1] to [14], wherein at least one surface of the member has a maximum height roughness of 0.05 to 5 μm.

[16] The member for a composite material according to any one of [1] to [15], wherein the member has a relative crystallinity of 50% or more.

[17] The member for a composite material according to any one of [1] to [16], wherein the member is a film.

[18] A composite material obtained by combining the member for a composite material according to any one of [1] to [17] and reinforcing fibers.

[19] The composite material according to [18], wherein the composite material is a prepreg.

[20] A mobile body that is an airplane, an automobile, a ship, or a railroad vehicle in which the composite material according to [18] or [19] is used.

[21] A member for a composite material containing a resin component that contains polyaryletherketone as a main component, wherein the resin component has a molecular weight distribution of 2 or more and less than 4 and a mass average molecular weight of 63000 or more, and wherein the member for a composite material is a plate-shaped member.

[22] The member for a composite material according to [21], wherein the polyaryletherketone is polyetheretherketone.

[23] The member for a composite material according to [21] or [22], wherein the plate-shaped member is a film.

[24] A method for manufacturing a film for a composite material containing a resin component that contains polyaryletherketone as a main component, the method including: preparing a resin component having a molecular weight distribution of 2 or more and less than 4 and a mass average molecular weight of 63000 or more as the resin component, and melt kneading the resin component using an extruder; and extruding the melted resin from a mouthpiece and cooling the melted resin using a casting roller to form the melted resin into a film, wherein the cooled film has a number of times of folding endurance of 5000 or more when measured under conditions of: a thickness of 100 μm, a folding angle of 135°, a folding speed of 175 cpm, and a load of 9.8 N, and wherein a puncture impact strength of the cooled film at 23° C. is 0.3 J or more and the puncture impact strength of the cooled film at −20° C. is 0.3 J or more, the puncture impact strengths being measured under conditions of: a thickness of 100 μm, a fixing frame inner diameter of 50 mm, a punching striker diameter of 12.7 mm, and a test speed of 3 m/second.

[25] The method for manufacturing a film for a composite material according to [24], wherein the polyaryletherketone has a molecular weight distribution of 2 or more and less than 4 and a mass average molecular weight of 63000 or more.

According to the present disclosure, it is possible to provide a member for a composite material having excellent durability, impact resistance, and productivity, and a composite material and a mobile body in which the member for a composite material is used.

BRIEF DESCRIPTION OF DRAWING

FIG. 1 is a diagram schematically showing a main portion of an embodiment of a method for manufacturing a film.

DESCRIPTION OF EMBODIMENTS

The following describes examples of embodiments of the present disclosure, but embodiments of the present disclosure are not limited to the following examples as long as such embodiments do not deviate from the gist of the present disclosure.

In the present disclosure, the following expression "X to Y" (X and Y are any numerical values) includes the meaning of "X or more and Y or less" as well as the meanings of "preferably more than X" and "preferably less than Y", unless otherwise specified.

Also, in the present disclosure, the expression "X or more" (X is any numerical value) includes the meaning of "preferably more than X", unless otherwise specified, and the expression "Y or less" (Y is any numerical value) includes the meaning of "preferably less than Y", unless otherwise specified.

In the present disclosure, "main component" refers to a component whose percentage in the object concerned is the largest, and the percentage of the main component in the object is preferably 50 mass % or more, more preferably 60 mass % or more, further preferably 70 mass % or more, particularly preferably 80 mass % or more, and most preferably 90 mass % or more.

A member for a composite material according to an embodiment of the present disclosure is a member for a composite material that contains a resin and reinforcing fibers having a number average fiber length of 5 mm or more. The member contains a resin component that contains polyaryletherketone as a main component. The resin component has a molecular weight distribution of 2 or more and less than 4, and a mass average molecular weight of 63000 or more.

A member for a composite material according to another embodiment of the present disclosure is a member for a composite material containing a resin component that contains polyaryletherketone as a main component. The resin component has a molecular weight distribution of 2 or more and less than 4, and a mass average molecular weight of 63000 or more. The member for a composite material is a plate-shaped member.

Preferably, the polyaryletherketone has a molecular weight distribution of 2 or more and less than 4, and a mass average molecular weight of 63000 or more. The Following is a Detailed Description.

<Resin Component>

The resin component contained in the member for a composite material of the present disclosure is not particularly limited so long as the resin component contains polyaryletherketone as the main component and has a molecular weight distribution of 2 or more and less than 4 and a mass average molecular weight of 63000 or more.

The molecular weight distribution of the resin component is 2 or more, preferably 2.1 or more, more preferably 2.2 or more, further preferably 2.5 or more, particularly preferably 3 or more, yet more preferably 3.2 or more, and most preferably 3.4 or more. If the molecular weight distribution is at least the lower limit value described above, adequate amounts of low molecular weight components and high molecular weight components are contained, and therefore, good fluidity and mechanical properties can be achieved at the same time. On the other hand, the molecular weight distribution of the resin component is less than 4, preferably 3.9 or less, more preferably 3.8 or less, and further preferably 3.7 or less. If the molecular weight distribution is narrow, the percentage of low molecular weight components that may serve as crystal nucleating agents is low, and even when the resin component is crystallized, the degree of crystallinity can be made low, and consequently durability and impact resistance become high. Also, if the percentage of low molecular weight components contained in raw materials used in the production of a film is high, the low molecular weight components may attach to a casting roller, and may be further transferred to the film, impairing the appearance of the film. If the molecular weight distribution is narrow and the percentage of low molecular weight components is low, it is possible to achieve a good effect of preventing contamination of the casting roller and obtaining a film having a good appearance. Furthermore, there is also an advantage in that when a composite material containing reinforcing fibers is manufactured, the manufacturing apparatus can be kept from being contaminated by volatilized low molecular weight components.

The mass average molecular weight of the resin component is 63000 or more, preferably 65000 or more, more preferably 68000 or more, further preferably 70000 or more, yet more preferably 72000 or more, further preferably 75000 or more, yet more preferably 78000 or more, particularly preferably 80000 or more, yet more preferably 83000 or more, and most preferably 85000 or more. If the mass average molecular weight is at least the lower limit value described above, mechanical properties such as durability and impact resistance are good. On the other hand, the mass average molecular weight of the resin component is preferably 150000 or less, more preferably 140000 or less, further preferably 135000 or less, more preferably 130000 or less, particularly preferably 125000 or less, yet more preferably 120000 or less, and most preferably 115000 or less. If the mass average molecular weight is no greater than the upper limit value described above, the degree of crystallinity, the crystallization rate, and fluidity during melt molding tend to be good.

The percentage of the content of polyaryletherketone in the resin component, or in particular, the percentage of the content of polyetheretherketone, which is preferably used, is preferably 50 mass % or more, more preferably 60 mass % or more, further preferably 70 mass % or more, particularly preferably 80 mass % or more, and most preferably more than 90 mass %. In the case where a resin other than polyaryletherketone is contained, if the percentage of the content of polyaryletherketone is within the above range, it is easy to impart required effects as appropriate while maintaining the effects of the present disclosure.

When another resin component is added to modify polyaryletherketone, there is no particular limitation on the type of the resin component, and it is possible to use polyethylene, polypropylene, polyvinyl chloride, polystyrene, polyvinylidene chloride, polyvinyl alcohol, ethylene-vinyl alcohol copolymer, polymethylpentene, polyphenylene ether, polyethylene terephthalate, polybutylene terephthalate, polyacetal, aliphatic polyamide, polymethyl methacrylate, polycarbonate, ABS, aromatic polyamide, polyphenylene sulfide, polyarylate, polyether imide, polyamide imide, polysulfone, polyethersulfone, liquid crystal polymers, copolymers of any of these, and mixtures of any of these, for example. Out of these, polyphenylene sulfide, polyarylate, polyether imide, polyamide imide, polysulfone, polyethersulfone, and liquid crystal polymers can be preferably used, and polyether imide can be particularly preferably used, because the molding temperatures of these resins are close to that of polyaryletherketone, and it is easy to suppress decomposition and cross linking during melt molding. Polyaryletherketone and polyether imide are highly compatible with each other and are mixed at the molecular level, and therefore, it is easy to improve the glass transition temperature of polyaryletherketone and control crystallinity.

In the case where polyetheretherketone is used as the polyaryletherketone, resins similar to the above-listed resins used to modify polyaryletherketone can be used as other resin components added to modify polyetheretherketone. It is also preferable to use polyetheretherketone together with polyaryletherketone other than polyetheretherketone, such as polyether ketone, polyether ketone ketone, polyether ketone ether ketone ketone, or polyether ether ketone ketone.

[Polyaryletherketone]

The following describes polyaryletherketone.

Polyaryletherketone is a homopolymer or copolymer that contains a monomer unit having at least one aryl group, at least one ether group, and at least one ketone group. Examples of polyaryletherketone include polyetheretherketone, polyether ketone ketone, polyether ketone, polyether ketone ether ketone ketone, polyether ether ketone ketone, polyether diphenyl ether ketone, and copolymers of any of these (e.g., copolymer of polyether ketone and polyether diphenyl ether ketone). Out of these, polyetheretherketone is particularly preferable because polyetheretherketone has excellent heat resistance, mechanical properties, chemical resistance, and the like.

The molecular weight distribution of polyaryletherketone is preferably 2 or more, more preferably 2.1 or more, further preferably 2.2 or more, yet more preferably 2.5 or more, particularly preferably 3 or more, yet more preferably 3.2 or more, and most preferably 3.4 or more. If the molecular weight distribution is at least the lower limit value described above, adequate amounts of low molecular weight components and high molecular weight components are contained, and therefore, it is easy to achieve good fluidity and mechanical properties at the same time. On the other hand, the molecular weight distribution of polyaryletherketone is preferably less than 4, more preferably 3.9 or less, further preferably 3.8 or less, and particularly preferably 3.7 or less. If the molecular weight distribution is narrow, the percentage of low molecular weight components that may serve as crystal nucleating agents is low, and even when polyaryletherketone is crystallized, the degree of crystallinity can be made low, and consequently durability and impact resistance tend to become high. Also, if the percentage of low molecular weight components contained in raw materials used in the production of a film is high, the low molecular weight components may attach to a casting roller, and may be further transferred to the film, impairing the appearance of the film. If the molecular weight distribution is narrow and the percentage of low molecular weight components is low, it is possible to achieve a good effect of preventing contamination of the casting roller and obtaining a film having a good appearance. Furthermore, there is also an advantage in that when a composite material containing reinforcing fibers is manufactured, the manufacturing apparatus is unlikely to be contaminated by volatilized low molecular weight components.

The mass average molecular weight of polyaryletherketone is preferably 63000 or more, more preferably 65000 or more, further preferably 68000 or more, yet more preferably 70000 or more, further preferably 72000 or more, yet more preferably 75000 or more, further preferably 78000 or more, particularly preferably 80000 or more, yet more preferably 83000 or more, and most preferably 85000 or more. If the mass average molecular weight of polyaryletherketone is at least the lower limit value described above, mechanical properties such as durability and impact resistance tend to be good. On the other hand, the mass average molecular weight is preferably 150000 or less, more preferably 140000 or less, further preferably 135000 or less, more preferably 130000 or less, particularly preferably 125000 or less, yet more preferably 120000 or less, and most preferably 115000 or less. If the mass average molecular weight of polyaryletherketone is no greater than the upper limit value described above, the degree of crystallinity, the crystallization rate, and fluidity during melt molding tend to be good.

The following describes polyetheretherketone, which is particularly preferably used among polyaryletherketones.

[Polyetheretherketone]

Polyetheretherketone is only required to be a resin that has a structural unit including at least two ether groups and a ketone group, but polyetheretherketone that has a repeating unit represented by the following general formula (1) is preferable because of its high thermal stability, melt moldability, stiffness, chemical resistance, impact resistance, and durability.

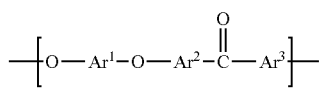

(1)

In the above general formula (1), each of $Ar^1$ to $Ar^3$ represents an arylene group having 6 to 24 carbon atoms, independently of each other, and may optionally include a substituent.

The arylene groups represented by $Ar^1$ to $Ar^3$ in the above general formula (1) may differ from each other, but preferably are the same as each other. Specific examples of the arylene groups represented by $Ar^1$ to $Ar^3$ include phenylene group and biphenylene group, out of which phenylene group is preferable, and p-phenylene group is more preferable.

Examples of substituents that the arylene groups represented by $Ar^1$ to $Ar^3$ may have include alkyl groups having 1 to 20 carbon atoms such as methyl group and ethyl group and alkoxy groups having 1 to 20 carbon atoms such as methoxy group and ethoxy group. In the case where $Ar^1$ to $Ar^3$ have substituents, the number of substituents is not particularly limited.

In particular, polyetheretherketone that has a repeating unit represented by the following structural formula (2) is preferable from the viewpoints of thermal stability, melt moldability, stiffness, chemical resistance, impact resistance, and durability.

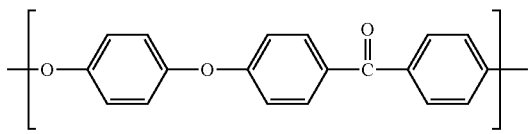

(2)

The molecular weight distribution of polyetheretherketone is preferably 2 or more, more preferably 2.1 or more, further preferably 2.2 or more, yet more preferably 2.5 or more, particularly preferably 3 or more, yet more preferably 3.2 or more, and most preferably 3.4 or more. If the molecular weight distribution is at least the lower limit value described above, adequate amounts of low molecular weight components and high molecular weight components are contained, and therefore, it is easy to achieve good fluidity and mechanical properties at the same time. On the other hand, the molecular weight distribution of polyetheretherketone is preferably less than 4, more preferably 3.9 or less, further preferably 3.8 or less, and particularly preferably 3.7 or less. If the molecular weight distribution is narrow, the percentage of low molecular weight components that may serve as crystal nucleating agents is low, and even when polyetheretherketone is crystallized, the degree of crystallinity can be made low, and consequently durability and impact resistance tend to become high. Also, if the percentage of low molecular weight components contained in raw materials used in the production of a film is high, the low molecular weight components may attach to a casting roller, and may be further transferred to the film, impairing the appearance of the film. If the molecular weight distribution is narrow and the percentage of low molecular weight components is low, it is possible to achieve a good effect of preventing contamination of the casting roller and obtaining a film having a good appearance. Furthermore, there is also an advantage in that when a composite material containing reinforcing fibers is manufactured, the manufacturing apparatus is unlikely to be contaminated by volatilized low molecular weight components.

The mass average molecular weight of polyetheretherketone is preferably 63000 or more, more preferably 65000 or more, further preferably 68000 or more, yet more preferably 70000 or more, further preferably 72000 or more, yet more preferably 75000 or more, further preferably 78000 or more, particularly preferably 80000 or more, yet more preferably 83000 or more, and most preferably 85000 or more. If the mass average molecular weight of polyetheretherketone is at least the lower limit value described above, mechanical properties such as durability and impact resistance tend to be good. On the other hand, the mass average molecular weight is preferably 150000 or less, more preferably 140000 or less, further preferably 135000 or less, more preferably 130000 or less, particularly preferably 125000 or less, yet more preferably 120000 or less, and most preferably 115000 or less. If the mass average molecular weight of polyetheretherketone is no greater than the upper limit value described above, the degree of crystallinity, the crystallization rate, and fluidity during melt molding tend to be good.

The molecular weight and the molecular weight distribution described above can be determined through gel permeation chromatography using an eluent in which the resin component to be used dissolves. As the eluent, it is possible to use a liquid mixture of chlorophenol and a halogenated benzene such as chlorobenzene, chlorotoluene, bromobenzene, bromotoluene, dichlorobenzene, dichlorotoluene, dibromobenzene, or dibromotoluene, or a liquid mixture of pentafluorophenol and chloroform, for example.

Specifically, the molecular weight and the molecular weight distribution can be measured using a method described later in Examples, or the following method, for example.

(1) A film of the resin component such as polyetheretherketone in the amorphous state is obtained. For example, the film in the amorphous state is obtained by pressing resin pellets of polyetheretherketone or the like at 350° C. to 400° C., for example, and then rapidly cooling the resin, or in the case where the film is formed using an extruder, the temperature of a casting roller is set low, for example, 20° C. to 140° C. to cool the resin.

(2) 3 g of pentafluorophenol is added to 9 mg of the film.

(3) The mixture is melted by being heated at 100° C. for 60 minutes using a heat block.

(4) Subsequently, the melted mixture is taken out of the heat block and cooled, and then 6 g of chloroform at normal temperature (about 23° C.) is added gently little by little, and the mixture is shaken moderately.

(5) Thereafter, the number average molecular weight (Mn), the mass average molecular weight (Mw), and the molecular weight distribution (Mw/Mn) of a sample obtained by filtering the mixture with a 0.45 μm PTFE (polytetrafluoroethylene) cartridge filter are measured using gel permeation chromatography.

The crystal melting temperature of polyaryletherketone, or particularly polyetheretherketone is preferably 330° C. or more, more preferably 331° C. or more, further preferably 332° C. or more, and particularly preferably 333° C. or more. If the crystal melting temperature of polyaryletherketone is at least the lower limit value described above, the obtained member for a composite material tends to have high heat resistance. On the other hand, the crystal melting temperature of polyaryletherketone, or particularly polyetheretherketone is preferably 370° C. or less, more preferably 365° C. or less, further preferably 360° C. or less, particularly preferably 355° C. or less, and most preferably 350° C. or less. If the crystal melting temperature of polyaryletherketone is not higher than the upper limit value described above, fluidity during melt molding tends to be high in the manufacture of the member for a composite material, for example.

The crystal melting temperature of polyaryletherketone, or particularly polyetheretherketone can be determined based on a peak top temperature of a melting peak in a DSC curve that is detected while polyaryletherketone is heated at a heating rate of 10° C./minute in a temperature range of 25° C. to 400° C. using a differential scanning calorimeter (e.g., "Pyris1 DSC" manufactured by PerkinElmer, Inc.) in accordance with JIS K7121:2012.

The crystal heat of fusion of polyaryletherketone, or particularly polyetheretherketone is preferably 30 J/g or more, more preferably 31 J/g or more, further preferably 32 J/g or more, and particularly preferably 33 J/g or more. If the crystal heat of fusion of polyaryletherketone is at least the lower limit value described above, the obtained member for a composite material tends to have a sufficient degree of crystallinity and consequently have high heat resistance and stiffness. On the other hand, the crystal heat of fusion of polyaryletherketone, or particularly polyetheretherketone is preferably 45 J/g or less, more preferably 43 J/g or less, and further preferably 40 J/g or less. If the crystal heat of fusion of polyaryletherketone is no greater than the upper limit value described above, the degree of crystallinity is not excessively high, and accordingly, melt moldability tends to be good in the manufacture of the member for a composite material, for example, and the obtained member for a composite material tends to have high durability and impact resistance.

The crystal heat of fusion of polyaryletherketone, or particularly polyetheretherketone can be determined based on the area of a melting peak in a DSC curve that is detected while polyaryletherketone is heated at a heating rate of 10° C./minute in a temperature range of 25° C. to 400° C. using a differential scanning calorimeter (e.g., "Pyris1 DSC" manufactured by PerkinElmer, Inc.) in accordance with JIS K7122:2012.

The crystallization temperature of polyaryletherketone, or particularly polyetheretherketone in a temperature lowering process is preferably 280° C. or more, more preferably 281° C. or more, further preferably 282° C. or more, particularly preferably 283° C. or more, and most preferably 284° C. or more. If the crystallization temperature of polyaryletherketone in the temperature lowering process is at least the lower limit value described above, the crystallization rate is high and the productivity of the member for a composite material tends to be high. Specifically, in the manufacture of a film, for example, if a casting roller is set to a temperature that is equal to or higher than the glass transition temperature and is lower than or equal to the crystal melting temperature, crystallization is promoted while resin is in contact with the casting roller, and a crystallized film is obtained. If the crystallization temperature in the temperature lowering process is at least the lower limit value described above, the crystallization rate is high, and crystallization can be completed on the casting roller. Therefore, the elasticity modulus becomes high, and consequently the film can be kept from sticking to the roller and tends to have a good appearance.

On the other hand, the crystallization temperature of polyaryletherketone, or particularly polyetheretherketone in the temperature lowering process is preferably 310° C. or less, more preferably 306° C. or less, further preferably 304° C. or less, and particularly preferably 302° C. or less. If the crystallization temperature in the temperature lowering process is not higher than the upper limit value described above, the crystallization rate is not excessively high, and accordingly, cooling unevenness can be suppressed when the member for a composite material such as a film is molded, and a uniformly-crystallized high-quality member for a composite material tends to be obtained.

The crystallization temperature of polyaryletherketone, or particularly polyetheretherketone in the temperature lowering process can be determined based on a peak top temperature of a crystallization peak in a DSC curve that is detected while the temperature of polyaryletherketone is lowered at a rate of 10° C./minute in a temperature range of 400° C. to 25° C. using a differential scanning calorimeter (e.g., "Pyris1 DSC" manufactured by PerkinElmer, Inc.) in accordance with JIS K7121:2012.

There is no particular limitation on the method for manufacturing polyaryletherketone, or particularly polyetheretherketone having a molecular weight distribution of 2 or more and less than 4 and a mass average molecular weight of 63000 or more, and a known method can be used. In the manufacture, conditions for achieving the target molecular weight distribution and the target mass average molecular weight can be selected and used as appropriate. Specifically, it is possible to adjust the type, amount, concentration, or the manner of addition of monomers used in polymerization, a polymerization initiator, a catalyst, an optionally added chain transfer agent, or the like, or adjust polymerization conditions such as the polymerization temperature, the polymerization time, and the polymerization pressure, for example. It is also possible to adopt so-called multi-stage polymerization in which polymerization is performed while changing polymerization conditions stepwise.

<Member for Composite Material>

The above-described resin component that contains polyaryletherketone, or preferably polyetheretherketone as the main component and has a molecular weight distribution of 2 or more and less than 4 and a mass average molecular weight of 63000 or more can be suitably used as a member for a composite material (hereinafter may also be referred to as "the member"), which is a material member for obtaining a composite material that contains a resin and fibers (reinforcing fibers) for reinforcing the resin, and in particular, can be more suitably used as a member for a composite material that contains a resin and reinforcing fibers having a number average fiber length of 5 mm or more. In particular, the member contains polyaryletherketone, or preferably polyetheretherketone having the specific molecular weight distribution and the specific mass average molecular weight described above, and therefore, the obtained member for a composite material tends to have high durability, impact resistance, and productivity. These advantages owing to containing the specific polyaryletherketone, or particularly polyetheretherketone are noticeable particularly when the member and reinforcing fibers having a number average fiber length of 5 mm or more are combined.

The member may also contain various additives such as a heat stabilizer, antioxidant, ultraviolet absorbing agent, photostabilizer, antibacterial agent, fungicide, antistatic agent, lubricant, pigment, dye, or filler so long as the effects of the present disclosure are not impaired.

The percentage of the resin component, particularly polyaryletherketone, or preferably polyetheretherketone in the member is preferably 35 mass % or more, more preferably 40 mass % or more, further preferably 50 mass % or more, particularly preferably 60 mass % or more, yet more preferably 70 mass % or more, and most preferably 80 mass % or more. If the percentage of the resin component, particularly polyaryletherketone, or preferably polyetheretherketone contained in the member is at least the lower limit value described above, the member is likely to have high heat resistance and stiffness. On the other hand, the upper limit is not particularly limited. In order for the member to sufficiently exhibit properties such as heat resistance and stiffness, it is preferable that the percentage of the resin component, particularly polyaryletherketone, or preferably polyetheretherketone is as high as possible, but when an additive, a filler, or the like is further contained to modify the resin component, particularly polyaryletherketone, or preferably polyetheretherketone, the percentage of the resin component, particularly polyaryletherketone, or preferably polyetheretherketone is preferably 95 mass % or less, more preferably 90 mass % or less, and further preferably 85 mass % or less. If the percentage of the resin component, particularly polyaryletherketone, or preferably polyetheretherketone contained in the member is no greater than the upper limit value described above, when an additive, a filler, or the like is further contained, effects of those components are likely to be exhibited sufficiently.

The member may be in a state of not having been completely crystallized or in a crystallized state. The crystallinity can be adjusted as appropriate according to the objective by using a known method in the manufacturing process. In general, toughness is high in the uncrystallized state, and heat resistance and stiffness are high in the crystallized state. It is preferable that the member has been completely crystallized for applications in which higher degrees of heat resistance, stiffness, and the like are required. It should be noted that the state of having been completely crystallized refers to a state where no peak for heat generation accompanying crystallization is observed in a temperature raising process of differential scanning calorimetry (DSC).

[Crystal Melting Temperature]

The crystal melting temperature of the member is preferably 330° C. or more, more preferably 331° C. or more, further preferably 332° C. or more, and particularly preferably 333° C. or more. If the crystal melting temperature of the member is at least the lower limit value described above, heat resistance tends to be high. On the other hand, the crystal melting temperature is preferably 370° C. or less, more preferably 365° C. or less, further preferably 360° C. or less, particularly preferably 355° C. or less, and most preferably 350° C. or less. If the crystal melting temperature of the member is not higher than the upper limit value described above, processability in secondary processing, such as the ability to impregnate fibers when a composite material is manufactured using the member and reinforcing fibers, tends to be good.

The crystal melting temperature of the member can be determined based on a peak top temperature of a melting peak in a DSC curve that is detected while the member is heated at a heating rate of 10° C./minute in a temperature range of 25° C. to 400° C. using a differential scanning calorimeter (e.g., "Pyris1 DSC" manufactured by PerkinElmer, Inc.) in accordance with JIS K7121:2012.

[Crystal Heat of Fusion]

The crystal heat of fusion of the member is preferably 30 J/g or more, more preferably 31 J/g or more, further preferably 32 J/g or more, and particularly preferably 33 J/g or more. If the crystal heat of fusion of the member is at least the lower limit value described above, the member has a sufficient degree of crystallinity and consequently tends to have high heat resistance and stiffness. Also, when a composite material is manufactured by combining the member and reinforcing fibers, the composite material tends to have high heat resistance and stiffness. On the other hand, the crystal heat of fusion of the member is preferably 45 J/g or less, more preferably 43 J/g or less, and further preferably 40 J/g or less. If the crystal heat of fusion of the member is no greater than the upper limit value described above, the degree of crystallinity is not excessively high, and accordingly, processability in secondary processing, such as the ability to impregnate fibers when a composite material is manufactured using the member and reinforcing fibers, tends to be good.

The crystal heat of fusion of the member can be determined based on the area of a melting peak at the time of melting in a DSC curve that is detected while the member is heated at a heating rate of 10° C./minute in a temperature range of 25° C. to 400° C. using a differential scanning calorimeter (e.g., "Pyris1 DSC" manufactured by PerkinElmer, Inc.) in accordance with JIS K7122:2012.

[Crystallization Temperature]

The crystallization temperature of the member in a temperature lowering process is preferably 280° C. or more, more preferably 281° C. or more, further preferably 282° C. or more, particularly preferably 283° C. or more, and most preferably 284° C. or more. If the crystallization temperature of the member in the temperature lowering process is at least the lower limit value described above, the crystallization rate is high and a cycle of the manufacture of a composite material manufactured using the member and reinforcing fibers can be shortened, and the productivity tends to be high.

On the other hand, the crystallization temperature in the temperature lowering process is preferably 310° C. or less, more preferably 306° C. or less, further preferably 304° C. or less, and particularly preferably 302° C. or less. If the crystallization temperature of the member in the temperature lowering process is not higher than the upper limit value described above, the crystallization rate is not excessively high, and accordingly, cooling unevenness can be suppressed when a composite material is manufactured using the member and reinforcing fibers, and a uniformly-crystallized high-quality composite material tends to be obtained. In addition, there is also an advantage in that it is easy to sufficiently impregnate reinforcing fibers with the member in the manufacture of a composite material, and the obtained composite material is likely to be uniformly crystallized and have high quality.

The crystallization temperature of the member can be determined based on a peak top temperature of a crystallization peak in a DSC curve that is detected while the temperature of the member is lowered at a rate of 10° C./minute in a temperature range of 400° C. to 25° C. using a differential scanning calorimeter (e.g., "Pyris1 DSC" manufactured by PerkinElmer, Inc.) in accordance with JIS K7121:2012.

[Number of Times of Folding Endurance]

The number of times of folding endurance of the member is preferably 5000 or more, more preferably 6000 or more, further preferably 7000 or more, particularly preferably 8000 or more, yet more preferably 9000 or more, and most preferably 10000 or more. If the number of times of folding endurance is within the above range, the durability of the member is sufficiently high, and the composite material to be obtained also has high durability and is unlikely to be ruptured even when used in applications in which stress is repeatedly applied. The number of times of folding endurance can be measured in accordance with JIS P8115:2001 under the conditions of: a thickness of 100 µm, a folding angle of 135°, a folding speed of 175 cpm, and a load of 9.8 N.

[Puncture Impact Strength]

The puncture impact strength of the member measured under the conditions of: a thickness of 100 µm, 23° C., a fixing frame inner diameter of 50 mm, a punching striker diameter of 12.7 mm, and a test speed of 3 m/second is preferably 0.3 J or more, more preferably 0.4 J or more, further preferably 0.6 J or more, and particularly preferably 0.7 J or more. If the puncture impact strength at 23° C. is within the above range, impact resistance is sufficiently high, the member for a composite material is unlikely to be ruptured even when external impact is applied, and the composite material to be obtained is also likely to have high impact resistance.

The puncture impact strength of the member measured under the conditions of: a thickness of 100 µm, −20° C., a fixing frame inner diameter of 50 mm, a punching striker diameter of 12.7 mm, and a test speed of 3 m/second is preferably 0.3 J or more, more preferably 0.4 J or more, and further preferably 0.5 J or more. If the puncture impact strength at −20° C. is within the above range, impact resistance is sufficiently high particularly at low temperatures, the member for a composite material is unlikely to be ruptured even when external impact is applied, and the composite material to be obtained is also likely to have high impact resistance.

The puncture impact strengths at 23° C. and −20° C. can be measured with reference to JIS K7124-2:1999 under the conditions of: a thickness of 100 µm, a measurement sample fixing frame with an inner diameter of 50 mm, a punching striker diameter of 12.7 mm, and a test speed of 3 m/second, and when the thickness of the member is 1 mm or more, the puncture impact strengths can be measured under similar conditions with reference to JIS K7211-2:2006.

[Thickness Accuracy]

When the member has a thin flat shape and its thickness is extremely small compared with its length and width, as in the cases of a film, a sheet, a plate, and the like, the thickness accuracy of the member is preferably 7% or less, more preferably 5% or less, further preferably 4% or less, particularly preferably 3% or less, yet more preferably 2.5% or less, and most preferably 2% or less. If the thickness accuracy is within the above range, when the member and reinforcing fibers are combined, variation in the percentage of reinforcing fibers in the obtained composite material is likely to be small. That is, a composite material that has small variation in mechanical property values such as the strength between portions thereof and has high uniformity in mechanical properties is likely to be obtained. The lower limit of the thickness accuracy is not particularly limited and is preferably 0%, but is usually 0.1%, and may be 0.3%, 0.5%, 0.8%, or 1%.

The thickness accuracy can be calculated using the following formula 1 from an average value and a standard deviation of measured film thicknesses, and more specifically, can be measured using a method described later in Examples.

$$\text{Thickness accuracy (\%)} = \text{standard deviation(µm)}/\text{average value(µm)} \times 100 \quad \text{[Formula 1]}$$

[Surface Roughness]

In the case where the member has a thin flat shape and its thickness is extremely small compared with its length and width, as in the cases of a film, a sheet, a plate, and the like, it is preferable that surface roughness of at least one surface of the member is within a specific range. Specifically, it is preferable that the arithmetic mean height (Sa), the maximum height (Sz), the arithmetic mean roughness (Ra), and the maximum height roughness (Rz) of at least one surface of the member are within specific ranges described below. It is also preferable that surface roughness of both surfaces of the member is within the specific ranges described below.

[Arithmetic Mean Height (Sa)]

The arithmetic mean height (Sa) of at least one surface of the member is preferably 0.001 µm or more, more preferably 0.005 µm or more, further preferably 0.007 µm or more, particularly preferably 0.01 µm or more, yet more preferably 0.015 µm or more, and most preferably 0.018 µm or more. Also, the arithmetic mean height (Sa) is preferably 1 µm or less, more preferably 0.5 µm or less, further preferably 0.2 µm or less, particularly preferably 0.1 µm or less, yet more preferably 0.08 µm or less, and most preferably 0.05 µm or less.

If the arithmetic mean height (Sa) is at least the lower limit value described above, problems such as meandering and skewing of a film or the like are unlikely to occur due to a reduction in smoothness when the film or the like is fed from a film roll or the like during a process of layering the member on a reinforcing fiber sheet or the like in the manufacture of a composite material such as a prepreg, and processability of the member for a composite material is likely to be good. There is also an advantage in that the surface of the film or the like is unlikely to be damaged by sparks generated due to static electricity accumulated in the film roll or the like when the film is unrolled, and foreign matter is unlikely to be mixed in the obtained composite material due to floating dust being attracted to the surface of the film or the like by static electricity and attaching to the surface. Also, if the arithmetic mean height (Sa) is no greater than the upper limit value described above, when the member and reinforcing fibers are combined, variation in the percentage of reinforcing fibers in the obtained composite material is likely to be small. That is, a composite material that has small variation in mechanical property values such as the strength between portions thereof and has high uniformity in mechanical properties is likely to be obtained. There is also an advantage in that when the film or the like is fed from the film roll or the like and conveyed, problems such as sliding, displacement, and twisting of the film and formation of creases in the film are unlikely to occur on a conveyance roller.

The arithmetic mean height (Sa) can be measured using a white-light interference microscope, and more specifically, using a method described later in Examples.

[Maximum Height (Sz)]

The maximum height (Sz) of at least one surface of the member is preferably 0.1 μm or more, more preferably 0.3 μm or more, further preferably 0.5 μm or more, particularly preferably 0.7 μm or more, and most preferably 0.8 μm or more. Also, the maximum height (Sz) is preferably 10 μm or less, more preferably 7 μm or less, further preferably 5 μm or less, particularly preferably 3 μm or less, yet more preferably 2.5 μm or less, and most preferably 2 μm or less.

If the maximum height (Sz) is at least the lower limit value described above, problems such as meandering and skewing of a film or the like are unlikely to occur due to a reduction in smoothness when the film or the like is fed from a film roll or the like during the process of layering the member on a reinforcing fiber sheet or the like in the manufacture of a composite material such as a prepreg, and processability of the member for a composite material is likely to be good. Also, there is an advantage in that the surface of the film or the like is unlikely to be damaged by sparks generated due to static electricity accumulated in the film roll or the like when the film is unrolled, and foreign matter is unlikely to be mixed in the obtained composite material due to floating dust being attracted to the surface of the film or the like by static electricity and attaching to the surface. Also, if the maximum height (Sz) is no greater than the upper limit value described above, when the member and reinforcing fibers are combined, variation in the percentage of reinforcing fibers in the obtained composite material is likely to be small. That is, a composite material that has small variation in mechanical property values such as the strength between portions thereof and has high uniformity in mechanical properties is likely to be obtained. There is also an advantage in that when the film or the like is fed from the film roll or the like and conveyed, problems such as sliding, displacement, and twisting of the film and formation of creases in the film are unlikely to occur on a conveyance roller.

The maximum height (Sz) can be measured using a white-light interference microscope, and more specifically, using a method described later in Examples.

[Arithmetic Mean Roughness (Ra)]

The arithmetic mean roughness (Ra) of at least one surface of the member is preferably 0.005 μm or more, more preferably 0.008 μm or more, further preferably 0.01 μm or more, particularly preferably 0.015 μm or more, and most preferably 0.02 μm or more. Also, the arithmetic mean roughness (Ra) is preferably 1 μm or less, more preferably 0.7 μm or less, further preferably 0.5 μm or less, yet more preferably 0.3 μm or less, particularly preferably 0.2 μm or less, yet more preferably 0.15 μm or less, and most preferably 0.1 μm or less.

If the arithmetic mean roughness (Ra) is at least the lower limit value described above, problems such as meandering and skewing of a film or the like are unlikely to occur due to a reduction in smoothness when the film or the like is fed from a film roll or the like during the process of layering the member on a reinforcing fiber sheet or the like in the manufacture of a composite material such as a prepreg, and processability of the member for a composite material is likely to be good. Also, there is an advantage in that the surface of the film or the like is unlikely to be damaged by sparks generated due to static electricity accumulated in the film roll or the like when the film is unrolled, and foreign matter is unlikely to be mixed in the obtained composite material due to floating dust being attracted to the surface of the film or the like by static electricity and attaching to the surface. Also, if the arithmetic mean roughness (Ra) is no greater than the upper limit value described above, when the member and reinforcing fibers are combined, variation in the percentage of reinforcing fibers in the obtained composite material is likely to be small. That is, a composite material that has small variation in mechanical property values such as the strength between portions thereof and has high uniformity in mechanical properties is likely to be obtained. There is also an advantage in that when the film or the like is fed from the film roll or the like and conveyed, problems such as sliding, displacement, and twisting of the film and formation of creases in the film are unlikely to occur on a conveyance roller.

The arithmetic mean roughness (Ra) can be measured using a contact-type surface roughness measurement device in accordance with JIS B0601:2013, and more specifically, using a method described later in Examples.

[Maximum Height Roughness (Rz)]

The maximum height roughness (Rz) of at least one surface of the member is preferably 0.05 μm or more, more preferably 0.08 μm or more, further preferably 0.1 μm or more, particularly preferably 0.15 μm or more, and most preferably 0.2 μm or more. Also, the maximum height roughness (Rz) is preferably 5 μm or less, more preferably 3 μm or less, further preferably 2 μm or less, particularly preferably 1 μm or less, and most preferably 0.8 μm or less.

If the maximum height roughness (Rz) is at least the lower limit value described above, problems such as meandering and skewing of a film or the like are unlikely to occur due to a reduction in smoothness when the film or the like is fed from a film roll or the like during the process of layering the member on a reinforcing fiber sheet or the like in the manufacture of a composite material such as a prepreg, and processability of the member for a composite material is likely to be good. Also, there is an advantage in that the surface of the film or the like is unlikely to be damaged by sparks generated due to static electricity accumulated in the film roll or the like when the film is unrolled, and foreign matter is unlikely to be mixed in the obtained composite material due to floating dust being attracted to the surface of the film or the like by static electricity and attaching to the surface. Also, if the maximum height roughness (Rz) is no greater than the upper limit value described above, when the member and reinforcing fibers are combined, variation in the percentage of reinforcing fibers in the obtained composite material is likely to be small. That is, a composite material that has small variation in mechanical property values such as the strength between portions thereof and has high uniformity in mechanical properties is likely to be obtained. There is also an advantage in that when the film or the like is fed from the film roll or the like and conveyed, problems such as sliding, displacement, and twisting of the film and formation of creases in the film are unlikely to occur on a conveyance roller.

The maximum height roughness (Rz) can be measured using a contact-type surface roughness measurement device in accordance with JIS B0601:2013, and more specifically, using a method described later in Examples.

[Relative Crystallinity]

The relative crystallinity of the member is preferably 50% or more, more preferably 60% or more, further preferably 70% or more, particularly preferably 80% or more, yet more preferably 90% or more, and most preferably 95% or more. The upper limit is usually 100%. If the relative crystallinity of the member is at least the lower limit value described above, it is easy to suppress shrinkage caused by heat when the member and reinforcing fibers are pressed together while being heated to obtain a composite material, and heat resistance and stiffness can be further enhanced.

The relative crystallinity can be calculated using the following formula 2 based on the heat quantity (J/g) of a crystal melting peak and the heat quantity (J/g) of a recrystallization peak, which are obtained while the member is heated at a heating rate of 10° C./minute in a temperature range of 25° C. to 400° C. using a differential scanning calorimeter (e.g., "Pyris1 DSC" manufactured by PerkinElmer, Inc.).

Relative crystallinity (%)={1−(ΔHc/ΔHm)}×100    [Formula 2]

ΔHc: Heat quantity (J/g) of the recrystallization peak when the member is heated at the rate of 10° C./minute.
ΔHm: Heat quantity (J/g) of the crystal melting peak when the member is heated at the rate of 10° C./minute.

When there are a plurality of recrystallization peaks, the relative crystallinity is calculated using the sum of heat quantities of the plurality of recrystallization peaks as ΔHc, and when there are a plurality of crystal melting peaks, the relative crystallinity is calculated using the sum of heat quantities of the plurality of crystal melting peaks as ΔHm. When there are no recrystallization peaks (ΔHc=0 J/g) in the measurement performed using a differential scanning calorimeter, the member can be said to be a crystallized member, and when there is a recrystallization peak, the member can be said to be a member that has not been completely crystallized.

[Specific Gravity]

The specific gravity of the member is preferably 1.27 or more, and more preferably 1.28 or more. There is a correlation between the relative crystallinity and the specific gravity, and the higher the relative crystallinity is, the higher the specific gravity usually tends to be. Accordingly, if the specific gravity is at least the lower limit value described above, shrinkage caused by heat tends to be suppressed when the member and reinforcing fibers are pressed together while being heated to obtain a composite material, for example, and heat resistance and stiffness tend to be high. On the other hand, the specific gravity of the member is preferably 1.35 or less, and more preferably 1.34 or less.

The specific gravity is measured at a temperature of 23° C. in accordance with a measurement method specified in JIS K7112:1999 (D method).

[Heat Shrink Ratio]

The heat shrink ratio of the member is preferably 2.5% or less, more preferably 2.2% or less, further preferably 1.8% or less, particularly preferably 1.5% or less, yet more preferably 1.2% or less, still more preferably 0.8% or less, and most preferably 0.7% or less. If the heat shrink ratio is no greater than the upper limit value described above, shrinkage caused by heat tends to be suppressed when the member and reinforcing fibers are pressed together while being heated to obtain a composite material, for example, and formation of an appearance defect such as creases tends to be suppressed in the obtained composite material. The lower limit of the heat shrink ratio of the member is not particularly limited and is preferably 0%, but may be 0.1% or 0.2%.

The heat shrink ratio is determined using the following formula 3 by marking lines at an interval of 100 mm in a direction (TD) orthogonal to the direction (MD) in which resin flows, on a test piece having a size of 120 mm×120 mm cut out from the member having a film shape or the like, leaving the test piece in an environment at 200° C. for 10 minutes, and measuring the distance between the marked lines before and after the heating.

Heat shrink ratio (%)=[(distance between marked lines before heating−distance between marked lines after heating)/distance between marked lines before heating]×100    [Formula 3]

[Heat Shrinkage Stress]

The heat shrinkage stress of the member is preferably 1.2 mN or less, more preferably 1 mN or less, further preferably 0.8 mN or less, particularly preferably 0.5 mN or less, and most preferably 0.3 mN or less. If the heat shrinkage stress is no greater than the upper limit value described above, shrinkage caused by heat tends to be suppressed when the member and reinforcing fibers are pressed together while being heated to obtain a composite material, for example, and formation of an appearance defect such as creases tends to be suppressed in the obtained composite material. The lower limit of the heat shrinkage stress of the member is not particularly limited, and is preferably 0 mN.

The heat shrinkage stress can be determined using the following method.

A strip-shaped test piece having a length of 10 mm and a width of 3 mm is cut out from the member having a film shape or the like, one end of the test piece is set in the chuck of a load detector and the other end of the test piece is set in a fixing chuck, and the stress value at 145° C. is measured using a thermomechanical analyzer (e.g., thermomechanical analyzer "TMA7100" manufactured by Hitachi High-Tech Science Corporation) by heating the test piece at a heating rate of 5° C./minute from room temperature (23° C.) to 340° C. in a state where a load is not applied to the test piece. Measurement is performed for both the direction (MD) in which resin flows and the direction (TD) orthogonal to the direction MD, and the larger one of the measured stress values is taken to be the heat shrinkage stress of the present disclosure.

There is no particular limitation on the shape of the member, and the member may be shaped as any of a film, a plate, fibers, a bottle, a tube, a bar, powder, pellets, and the like, but the member is preferably shaped as a film, a plate, or fibers, more preferably a film or a plate, and further preferably a film. In the case where the member is a plate-shaped member, "plate shape" refers to a flat shape with any suitable maximum thickness, and the plate-shaped member encompasses not only so-called plates having a thickness of 1 mm or more, but also films having a thickness less than 1 mm. A thin plate-shaped member is preferable, and the thickness of the plate-shaped member is preferably 2 mm or less, more preferably less than 1 mm, further preferably 500 µm or less, particularly preferably 400 µm or less, yet more preferably 300 µm or less, and most preferably 250 µm or less. The lower limit value is usually 3 µm.

In the case where the member in the form of powder, pellets, or the like is used, the raw material resin may be used as is, or may be processed into the form of powder, pellets, or the like. In the case where the member has another shape, the member can be molded into various shapes, or preferably a film, a plate, or the like using a common molding method such as extrusion molding, injection molding, flow casting such as melt flow casting, or pressing. There is no particular limitation on the apparatus and processing conditions used in the molding methods, and known methods can be used. In particular, a member for a composite material molded into a film through extrusion molding, or particularly a T-die method is preferable from the viewpoint of processability when a composite material is obtained using the member and reinforcing fibers, which will be described later.

In the present disclosure, the term "film" encompasses sheets. The term "film" commonly refers to a thin flat product whose thickness is extremely small compared with its length and width, whose maximum thickness is suitably limited, and that is usually supplied in the form of a roll (Japan Industrial Standard JIS K6900:1994), and the term "sheet" commonly refers to a thin flat product whose thickness is relatively small compared with its length and width, according to the definition in JIS. However, the boundary between a sheet and a film is not clear, and therefore, the term "film" used in the present disclosure encompasses sheets. Accordingly, "film" may be read as "sheet".

<Method for Manufacturing Film>

In the case where the member is a film, there is no particular limitation on the method for manufacturing the film, and the member can be obtained as a non-stretched film or a stretched film, for example. It is preferable to obtain the member as a non-stretched film from the viewpoint of processability in secondary processing in the manufacture of a composite material. Here, "non-stretched film" refers to a film that is not stretched purposely to control the orientation of the film, and also encompasses a film that is oriented when taken onto a casting roller in extrusion molding such as the T-die method, for example, and a film that is stretched at a ratio less than double using a stretching roller.

A non-stretched film can be manufactured by melt-kneading constituent materials of the film and then extruding and cooling the kneaded product. A known kneader such as a single screw extruder or a twin screw extruder can be used in melt-kneading. The melting temperature is adjusted as appropriate according to the type and blending ratio of resin, the presence or absence of additives, and the type of additives. From the viewpoint of productivity and the like, the melting temperature is preferably 320° C. or more, more preferably 340° C. or more, further preferably 350° C. or more, and particularly preferably 360° C. or more. If the temperature of resin is at least the lower limit value described above, crystals of the raw material in the form of pellets or the like are sufficiently melted and are unlikely to remain in the film, and therefore, the number of times of folding endurance and the puncture impact strength are likely to be enhanced. On the other hand, the melting temperature is preferably 450° C. or less, more preferably 430° C. or less, further preferably 410° C. or less, and particularly preferably 390° C. or less. If the temperature of resin is not higher than the upper limit value described above, the resin is unlikely to decompose at the time of melt molding and the molecular weight is likely to be maintained, and accordingly, the number of times of folding endurance and the puncture impact strength of the film tend to be enhanced.

Cooling can be performed by bringing the melted resin into contact with a cooling device such as a cooled casting roller, for example. The cooling temperature (e.g., the temperature of the casting roller) varies depending on whether a crystallized film is to be manufactured or a film that has not been completely crystallized is to be manufactured. When a crystallized film is to be manufactured, the cooling temperature can be selected as appropriate such that the film has a desired degree of crystallinity. The cooling temperature is preferably higher than the glass transition temperature of the resin component contained in the member by 30° C. to 150° C., more preferably higher than the glass transition temperature by 35° C. to 140° C., and particularly preferably higher than the glass transition temperature by 40° C. to 135° C. If the cooling temperature is within the above range, the cooling rate of the film can be slowed down, and the relative crystallinity tends to become high.

For example, when polyetheretherketone is contained as the resin component, the cooling temperature (the temperature of the casting roller) is preferably 180° C. or more, more preferably 190° C. or more, and further preferably 200° C. or more.

In order to obtain a film having a higher degree of crystallinity, the cooling temperature (the temperature of the casting roller) is particularly preferably 210° C. or more, and most preferably 220° C. or more. On the other hand, the cooling temperature (the temperature of the casting roller) is preferably 300° C. or less, more preferably 280° C. or less, further preferably 270° C. or less, particularly preferably 260° C. or less, yet more preferably 250° C. or less, and most preferably 240° C. or less.

It is thought that the crystallization rate of a polymer material is maximized in a temperature range between the glass transition temperature and the crystal melting temperature due to the balance between the crystal nuclei forming rate and the crystal growth rate. When manufacturing a film having a high relative crystallinity, if the lower limit and the upper limit of the cooling temperature (the temperature of the casting roller) are within the above range, the crystallization rate is maximized and a crystallized film having good productivity is likely to be obtained.

On the other hand, when manufacturing a film that has not been completely crystallized, it is important to rapidly cool the melted resin to a temperature lower than or equal to the glass transition temperature to lower the mobility of molecules to such an extent that crystals cannot grow. In this case, the cooling temperature (e.g., the temperature of the casting roller) is preferably 50° C. or more, more preferably 100° C. or more, and further preferably 120° C. or more. On the other hand, the cooling temperature (the temperature of the casting roller) is preferably 150° C. or less, and more preferably 140° C. or less. When manufacturing a film that has not been completely crystallized, if the cooling temperature (the temperature of the casting roller) is within the above range, a film that is free from creases or a stuck portion generated through rapid cooling and has a good appearance is likely to be obtained.

The glass transition temperature described above refers to a value that is measured in accordance with JIS K7121:2012 by using a differential scanning calorimeter (e.g., "Pyris1 DSC" manufactured by PerkinElmer, Inc.) at a heating rate of 10° C./minute in a temperature range of 25° C. to 400° C. When a mixture of resins is used and there are a plurality of glass transition temperatures, the cooling temperature can be adjusted taking the highest glass transition temperature to be the glass transition temperature of the resin component.

In order to make the relative crystallinity of the member fall within the desired range described above, when the member is a film, for example, it is preferable to use extrusion molding and adjust conditions for extruding the film as appropriate, and it is more preferable to use any of the following methods (1) to (4) in the present disclosure. These methods may be used in combination. Out of these, the method (1) is preferable because creases are unlikely to be formed in the obtained composite material and energy consumption is low.

(1) A method of adjusting cooling conditions when melted resin is cooled and formed into a film. The melted resin can be cooled by using a casting roller as a cooling device and bringing the extruded melted resin into contact with the casting roller. Specifically, it is preferable to use the following method.

It is possible to use a method of setting the cooling temperature to be higher than the glass transition temperature of the resin component by 30° C. to 150° C. The cooling temperature is more preferably higher than the glass transition temperature of the resin component by 35° C. to 140° C., and particularly preferably higher than the glass transition temperature by 40° C. to 135° C. If the cooling temperature is within the above range, the cooling rate of the film can be slowed down, and the relative crystallinity tends to become high.

Particularly when polyetheretherketone is contained as the main component of the resin component, the cooling temperature is preferably 180° C. or more, more preferably 190° C. or more, further preferably 200° C. or more, and particularly preferably 210° C. or more.

On the other hand, the cooling temperature is preferably 300° C. or less, more preferably 280° C. or less, further preferably 260° C. or less, particularly preferably 250° C. or less, and most preferably 240° C. or less.

(2) A method of heating the film again using a heating roller. Specifically, it is possible to use a method of heating the film using a roller other than the casting roller, such as a longitudinal stretching machine. The heating temperature is preferably within a range similar to the range of the cooling temperature described above in (1).

(3) A method of heating the film again in an oven. Specifically, it is possible to use a method of heating the film with hot blast by passing the film through a drying apparatus such as a floating dryer, a tenter, or a band dryer. The heating temperature is preferably within a range similar to the range of the cooling temperature described above in (1).

(4) A method of heating the film again with infrared rays. Specifically, a far-infrared heater such as a ceramic heater may be placed between rollers and the film may be heated in a roll-to-roll process, or the film may be heated while being passed through a far-infrared dryer. The heating temperature is preferably within a range similar to the range of the cooling temperature described above in (1).

The processing described above in (2) to (4) may be performed at the same time as the film is manufactured, by providing equipment for the processing in the film manufacturing line, or the film may be wound into a roll and the processing may be performed on the film roll using such equipment provided outside the manufacturing line.

Also, there is no particular limitation on the method for adjusting the arithmetic mean height (Sa), the maximum height (Sz), the arithmetic mean roughness (Ra), and the maximum height roughness (Rz) of the member, and it is possible to use various methods including transfer processing such as embossing roll transfer, embossing belt transfer, and embossing film transfer, sandblasting, shotblasting, etching, engraving, and surface crystallization. In a flow casting process for obtaining the member by applying the resin component to a support and drying and heating the resin component, it is possible to use a method of appropriately adjusting surface roughness of a metal roll, an endless metal belt, a polymer film, or the like that is used as the support, through polishing or the like. Among these, a method of adjusting the surface roughness of the member to a desired roughness by casting melted resin in the form of a film on a roller such as a casting roller is preferable because it is easy to adjust the surface roughness continuously and uniformly while extruding the melted resin into the form of a film. In this case, the surface roughness of the resin film can be adjusted by adjusting the surface roughness, such as the arithmetic mean roughness, of the casting roller.

Also, there is no particular limitation on the method for adjusting the thickness accuracy of the member to fall within the desired range, and when the member is a film, for example, it is possible to use extrusion molding and adjust conditions for extruding the film as appropriate. Specifically, any of the following methods may be used, for example.

(1) A method of adjusting a lip opening by mechanically rotating a lip bolt of a die such as a T-die.

(2) A method of attaching heating devices at constant intervals on a die lip and adjusting the temperatures of the heating devices individually to adjust the film thickness using temperature-dependent change in the viscosity of the melted resin.

(3) A method of adjusting the distance between the die and the casting roller to suppress film vibration and pulsation in the extruded melted resin in the form of a film as far as possible.

(4) A method of placing a plate or a cover to intercept the flow of air so that pulsation will not occur due to the flow of gas such as ambient air when the extruded melted resin in the form of a film comes into contact with the casting roller.

(5) A method of adjusting the discharge amount of the melted resin extruded into the form of a film such that the discharge amount does not vary.

(6) A method of reducing the rotational fluctuation ratio of the casting roller to suppress rotational unevenness of the roller.

(7) A method (static close contact method) of bringing the extruded melted resin in the form of a film into close contact with the casting roller with electrostatic force by giving static charge to the melted resin using an electrode to which a high voltage is applied.

(8) A method of bringing the extruded melted resin in the form of a film into close contact with the casting roller by blowing a curtain of compressed air toward the melted resin.

(9) A method of bringing the extruded melted resin in the form of a film into close contact with the casting roller using a nip roller.

When the member is used as a film, there is no particular limitation on the thickness of the film, and the thickness is usually 3 μm or more, preferably 6 μm or more, more preferably 9 μm or more, further preferably 12 μm or more, yet more preferably more than 15 μm, still more preferably 20 μm or more, particularly preferably 35 μm or more, yet more preferably 50 μm or more, and most preferably 60 μm or more. On the other hand, the thickness of the film is preferably 500 μm or less, more preferably 450 μm or less, further preferably 400 μm or less, yet more preferably 350 μm or less, particularly preferably 300 μm or less, yet more preferably 250 μm or less, and most preferably 200 μm or less. If the thickness of the film is within the above range, the thickness is not excessively thick or excessively thin, and accordingly, the balance between mechanical properties, film formability, insulation properties, and the like and processability in secondary processing when the film and reinforcing fibers are combined tend to be good.

The thickness of the film specifically refers to an average thickness measured using a method described in Examples.

In the case where the member is a film, another layer may be stacked on the film to form a multi-layer film so long as the effects of the present disclosure are not impaired. The multi-layer film can be obtained using a known method such as coextrusion, extrusion lamination, thermal lamination, or dry lamination.

[Applications and Manners of Use]

The member has excellent durability, impact resistance, and productivity, and therefore can be used as a material for a composite of resin and reinforcing fibers, in particular, reinforcing fibers having a number average fiber length of 5 mm or more. Particularly when the member is a film, the member can be suitably used as a material for a composite of the film and reinforcing fibers having a number average fiber length of 5 mm or more.

There is no particular limitation on the type of reinforcing fibers having a number average fiber length of 5 mm or more, and examples of the reinforcing fibers include inorganic fibers such as carbon fiber, glass fiber, boron fiber, and alumina fiber, organic fibers such as liquid crystal polymer fiber, polyethylene fiber, aramid fiber, and polyparaphenylene benzoxazole fiber, and metal fibers such as aluminum fiber, magnesium fiber, titanium fiber, SUS fiber, copper fiber, and carbon fiber covered with metal. Out of these, carbon fiber is preferable from the viewpoint of stiffness and light weight.

Examples of carbon fibers include polyacrylonitrile (PAN) carbon fiber, petroleum/coal pitch carbon fiber, rayon carbon fiber, and lignin carbon fiber, and any carbon fibers can be used. In particular, strands or tows of 12000 to 48000 filaments of PAN carbon fiber produced using PAN as the raw material are preferable because of high productivity in industrial scale production and high mechanical properties.

The number average fiber length is 5 mm or more, preferably 10 mm or more, more preferably 20 mm or more, further preferably 30 mm or more, particularly preferably 40 mm or more, and most preferably 50 mm or more. It is also preferable that the reinforcing fibers are continuous fibers. If the number average fiber length is at least the lower limit value described above, the obtained composite material tends to have sufficiently high mechanical properties. The upper limit of the number average fiber length is not particularly limited, but when the reinforcing fibers are non-continuous fibers in the form of a fabric, a knitted fabric, a non-woven fabric, or the like as described later, the number average fiber length is preferably 500 mm or less, more preferably 300 mm or less, and further preferably 150 mm or less. If the number average fiber length is no greater than the upper limit value described above, when a final product, in particular a final product having a complex shape, is molded using the composite material, a portion of the product having a complex shape tends to be sufficiently filled with reinforcing fibers, and a reduction in the strength of the portion tends to be suppressed.

The number average fiber length of reinforcing fibers refers to an average length in a portion where the lengths of the reinforcing fibers are observed to be the longest when the reinforcing fibers are observed using an electron microscope such as a scanning electron microscope or an optical microscope. More specifically, the number average fiber length can be determined by observing a cross section of the composite material in which the length direction of reinforcing fibers present in the composite material can be observed, and calculating the number average value of the measured fiber lengths.

As another method, it is also possible to use a method of making a thin film laminate using a dispersion of reinforcing fibers from which the resin component has been removed using a solvent or the like and that are dispersed in a suitable dispersing agent, and determining the number average fiber length in an image of the reinforcing fibers obtained using a scanner or the like, by using image processing software or the like.

The shape of reinforcing fibers is not particularly limited, and can be selected as appropriate from fiber bundles such as chopped strand and roving, fabrics such as plain fabric and twill fabric, knitted fabric, non-woven fabric, fiber paper, and reinforcing fiber sheet such as UD (unidirectional) material.

There is no particular limitation on the method for combining reinforcing fibers and the member, and it is possible to manufacture a composite material such as a prepreg that is a reinforcing fiber bundle or reinforcing fiber sheet impregnated or semi-impregnated with the member, by using a conventionally known method such as a resin film impregnation method (film stacking method), a commingled yarn method, a melting method, a solvent method, or a powder method such as a dry powder coating method or a powder suspension method. Out of these, the resin film impregnation method (film stacking method) is preferably used in the present disclosure.

Specifically, a prepreg can be obtained by layering the member on one side or both sides of the reinforcing fiber sheet described above, and heating and pressing the reinforcing fiber sheet and the member to melt the resin component of the member and impregnate the reinforcing fiber sheet with the resin component. By adjusting heating conditions and pressing conditions at this time, it is possible to obtain a prepreg in which the amount of voids is controlled. It should be noted that there is also a prepreg that is obtained without performing the pressing process and in which the member is temporarily joined to the reinforcing fiber sheet through heat fusion. In the case of such a prepreg in which the member is temporarily joined, or in particular, a prepreg that includes many voids, the production time can be reduced and consequently the production cost can be reduced, and there is also an advantage in that the prepreg is flexible and its shape can be easily changed to conform to an actual shape. The above-described method can be suitably used when the member is a film.

A composite material product can be obtained by performing a known process such as autoclave molding, infusion molding, heat and cool press molding, stamping, or automatic laminate molding performed by a robot on the prepreg, and molding conditions can be selected according to the amount of voids in the prepreg. Processability in secondary processing such as the ability to impregnate the reinforcing fiber sheet or the ability to be thermally fused with the reinforcing fiber sheet is required for the member in the form of a film or the like to be used in the manufacture of a prepreg. The member contains polyaryletherketone, or preferably polyetheretherketone having a specific molecular weight distribution and a specific mass average molecular weight, and the crystallinity of the member is suppressed adequately. Therefore, processability of the member in secondary processing is excellent, and the obtained composite material has excellent durability and impact resistance, and therefore can be used particularly favorably.

The percentage of the content of reinforcing fibers in the composite material obtained as described above is preferably 20 volume % or more, more preferably 30 volume % or more, and further preferably 40 volume % or more from the viewpoints of elasticity modulus and strength. On the other hand, the percentage of the content of reinforcing fibers in the composite material is preferably 90 volume % or less, more preferably 80 volume % or less, and further preferably 70 volume % or less.

The composite material obtained by combining the member and reinforcing fibers can be suitably used for a mobile body such as an airplane, an automobile, a ship, or a railroad vehicle, sports goods, home electric appliances, construction materials, or the like because of its heat resistance, light weight, mechanical strength, and the like. In particular, the use of the composite material as a constituent member of a mobile body such as an airplane, an automobile, a ship, or a railroad vehicle is industrially advantageous.

The present disclosure also discloses a method for manufacturing a film that contains polyaryletherketone as the main component of the resin component. In particular, the following manufacturing method can be suitably used in the case where polyaryletherketone is polyetheretherketone.

Specifically, the present disclosure discloses a method for manufacturing a film, including preparing a resin component having a molecular weight distribution of 2 or more and less than 4 and a mass average molecular weight of 63000 or more, melt kneading the resin component using an extruder, extruding the melted resin from a mouthpiece, and cooling the melted resin using a casting roller to form the melted resin into a film. The number of times of folding endurance of the cooled film is 5000 or more when measured under the conditions of: a thickness of 100 µm, a folding angle of 135°, a folding speed of 175 cpm, and a load of 9.8 N. The puncture impact strength of the cooled film at 23° C. is 0.3 J or more when measured under the conditions of: a thickness of 100 µm, a fixing frame inner diameter of 50 mm, a punching striker diameter of 12.7 mm, and a test speed of 3 m/second. The puncture impact strength of the cooled film at −20° C. measured under the same conditions is 0.3 J or more.

Furthermore, the present disclosure also discloses the method for manufacturing a film in which the crystal heat of fusion of the cooled film is 30 J/g or more and 45 J/g or less.

In the manufacturing method described above, the polyaryletherketone, or preferably polyetheretherketone preferably has a molecular weight distribution of 2 or more and less than 4 and a mass average molecular weight of 63000 or more.

In order to manufacture a film that has the number of times of folding endurance and the puncture impact strength described above and of which the crystal heat of fusion is preferably 30 J/g or more and 45 J/g or less, polyaryletherketone that is used as the raw material can be selected as appropriate and conditions for extruding the film can be adjusted as appropriate. In the present disclosure, it is preferable to use any of the following methods (1) to (4).

(1) A method of using polyaryletherketone, or preferably polyetheretherketone having a molecular weight distribution of 2 or more and less than 4 and a mass average molecular weight of 63000 or more, as the raw material. Details of other physical properties and the like of polyaryletherketone, or preferably polyetheretherketone are the same as the physical properties of polyaryletherketone and polyetheretherketone used in the member for a composite material described above, and therefore descriptions thereof are omitted here.

(2) A method of adjusting the temperature at the time of melt kneading performed using the extruder. Specifically, the temperature of resin at the outlet of the extruder is preferably 350° C. or more, more preferably 360° C. or more, further preferably 370° C. or more, and particularly preferably 380° C. or more. If the temperature of resin at the outlet of the extruder is at least the lower limit value described above, pellets are sufficiently melted and the melted resin is stably extruded. Moreover, crystals in the pellets are sufficiently melted and are unlikely to remain in the film, and accordingly, the number of times of folding endurance and the puncture impact strength are likely to be enhanced, and the obtained film is likely to have a good appearance. On the other hand, the temperature of resin at the outlet of the extruder is preferably 450° C. or less, more preferably 430° C. or less, and further preferably 410° C. or less. If the temperature of resin at the outlet of the extruder is not higher than the upper limit value described above, the resin is unlikely to decompose during melt molding and the molecular weight is likely to be maintained, and accordingly, the number of times of folding endurance and the puncture impact strength of the film tend to be enhanced.

(3) A method of adjusting cooling conditions when melted resin is cooled and formed into a film. Cooling can be performed by using a casting roller as a cooling device and bringing the extruded melted resin into contact with the casting roller, for example.

Specifically, the following methods (3-1) and (3-2) are preferably used.

(3-1) A method of adjusting the temperature of the casting roller. Specifically, the temperature of the casting roller is preferably higher than the glass transition temperature of polyaryletherketone by 30° C. to 150° C., more preferably higher than the glass transition temperature by 35° C. to 140° C., and most preferably higher than the glass transition temperature by 40° C. to 135° C. More specifically, when the polyaryletherketone is polyetheretherketone, the temperature of the casting roller is preferably 180° C. or more, more preferably 190° C. or more, and further preferably 200° C. or more. On the other hand, the temperature of the casting roller is preferably 280° C. or less, more preferably 270° C. or less, further preferably 260° C. or less, particularly preferably 250° C. or less, and most preferably 240° C. or less.

(3-2) A method of adjusting the time from when melted resin is extruded from the mouthpiece to when cooling is started. This time can be adjusted by adjusting the distance from the mouthpiece to the casting roller, for example. The time from when melted resin is extruded to when cooling is started can be reduced by reducing the distance, and the start of cooling can be delayed by increasing the distance. The distance can be adjusted as appropriate taking the temperature of the extruded melted resin, the temperature of the casting roller, and the like into consideration, but the distance is preferably 5 mm or more, more preferably 7 mm or more, and further preferably 10 mm or more, and is preferably 100 mm or less, more preferably 70 mm or less, and further preferably 50 mm or less.

(4) In the case where the casting roller is used, a method of adjusting a contact angle θ when melted resin is brought into contact with the casting roller. As shown in FIG. 1, if melted resin is allowed to fall from the mouthpiece located at a position that is slightly shifted toward the center of the casting roller to come into contact with the casting roller, rather than being allowed to fall vertically toward the point of contact between the casting roller and a pressure roller, problems such as the formation of corrugations or creases are unlikely to occur when the melted resin is cooled and formed into a film, and a uniformly-crystallized film is likely to be obtained. As shown in FIG. 1, the contact angle θ refers to an angle formed between a straight line connecting the mouthpiece and the point of contact between a pressure roller 3 and a casting roller 4 and a vertical line (dotted line in FIG. 1) extending from the point of contact, and the contact angle θ is preferably 1° or more, more preferably 2° or more, and further preferably 3° or more, and is preferably 10° or less, more preferably 8° or less, and further preferably 5° or less.

A film obtained using the manufacturing method of the present disclosure has excellent durability, impact resistance, and productivity, and therefore can be suitably used as a material for a composite of resin and reinforcing fibers, or in particular, reinforcing fibers having a number average fiber length of 5 mm or more. Also, a composite material obtained by combining reinforcing fibers and the film obtained using the manufacturing method of the present disclosure can be suitably used for a mobile body such as an airplane, an automobile, a ship, or a railroad vehicle, sports goods, home electric appliances, construction materials, or the like because of its heat resistance, light weight, mechanical strength, and the like. In particular, the use of the composite material as a constituent member of a mobile body such as an airplane, an automobile, a ship, or a railroad vehicle is industrially advantageous. Details of these matters are the same as those described above for the member for a composite material and the composite material, and therefore descriptions thereof are omitted here.

EXAMPLES

The following describes the present disclosure more specifically using examples, but the present disclosure is not limited by the following examples.

1. Production of Film

In Examples and Comparative Examples, films were produced using, as raw materials, polyetheretherketones having the number average molecular weight (Mn), the mass average molecular weight (Mw), the molecular weight distribution (Mw/Mn), the crystal melting temperature (Tm), the crystal heat of fusion (ΔHm), and the crystallization temperature (Tc) shown in Table 1.

Examples 1 and 2 and Comparative Examples 1 to 6

Raw material pellets made of polyetheretherketone shown in Table 1 were put into a Φ 40 mm single screw extruder, melted while being kneaded, and extruded from a mouthpiece (T-die), and the extruded product was brought into close contact with a casting roller (arithmetic mean roughness (Ra): 0.03 μm, maximum height roughness (Rz): 0.34 μm) and cooled to obtain a crystallized film having a thickness of 100 μm. The temperatures of the extruder, a conduit, and the mouthpiece (T-die) were set to 380° C., the temperature of the casting roller was set to 210° C., and the film was formed with the lip clearance of the die lip adjusted as appropriate. The temperature of resin at the outlet of the extruder was 400° C. The crystal melting temperature, the crystal heat of fusion, the crystallization temperature, the number of times of folding endurance, and the puncture impact strength of the obtained crystallized film with the thickness of 100 μm and contamination of the roller were evaluated using methods described below.

Also, another crystallized film having a thickness of 50 μm was produced under the same conditions other than that the thickness was 50 μm, and thickness accuracy, surface roughness, relative crystallinity, the specific gravity, the heat shrink ratio, and the heat shrinkage stress of the film were evaluated.

Evaluation results are shown in Table 1.

2. Evaluation of Resin Raw Material and Film

Evaluation measurement of various items was performed as described below with respect to the resin raw materials used in Examples and Comparative Examples and the films obtained using the above-described method. It should be noted that the "length direction" of a film refers to the direction (MD) in which the film is extruded from the mouthpiece (T-die), and the "transverse direction" (TD) refers to the direction orthogonal to the length direction in the surface of the film.

(1) Molecular Weight Distribution (Mw/Mn), Mass Average Molecular Weight (Mw), and Number Average Molecular Weight (Mn)

With respect to the raw material resin pellets, measurement was performed under the following conditions using gel permeation chromatography (HLC-8320GPC (manufactured by Tosoh Corporation)).

Column: TSKgel guardcolumn SuperH-H (4.6 mmI.D.× 3.5 cm)+TSKgel SuperHM-H (6.0 mmI.D.×15 cm)×2 (manufactured by Tosoh Corporation)
Eluent: pentafluorophenol/chloroform=1/2 (mass ratio)
Detector: differential refractometer, polarity=(+)
Flow rate: 0.6 mL/minute
Column temperature: 40° C.
Sample concentration: 0.1 mass %
Sample injection amount: 20 μL
Calibration curve: third order approximation curve obtained using standard polystyrene (manufactured by Tosoh Corporation)

(2) Crystal Melting Temperature (Tm)

The crystal melting temperature was determined for the raw material resin pellets and the films obtained using the above-described method based on a peak top temperature of a melting peak in a DSC curve that was detected while the pellets or the film was heated at a heating rate of 10° C./minute in a temperature range of 25° C. to 400° C. using a differential scanning calorimeter "Pyris1 DSC" manufactured by PerkinElmer, Inc., in accordance with JIS K7121: 2012.

(3) Crystal Heat of Fusion (ΔHm)

The crystal heat of fusion was determined for the raw material resin pellets and the films obtained using the above-described method based on the area of a melting peak in a DSC curve that was detected while the pellets or the film was heated at a heating rate of 10° C./minute in a temperature range of 25° C. to 400° C. using the differential scanning calorimeter "Pyris1 DSC" manufactured by PerkinElmer, Inc., in accordance with JIS K7122:2012.

(4) Crystallization Temperature (Tc)

The crystallization temperature was determined for the raw material resin pellets and the films obtained using the above-described method based on a peak top temperature of a crystallization peak in a DSC curve that was detected while the temperature of the pellets or the film was lowered at a rate of 10° C./minute in a temperature range of 400° C. to 25° C. using the differential scanning calorimeter "Pyris1 DSC" manufactured by PerkinElmer, Inc., in accordance with JIS K7121:2012.

(5) Number of Times of Folding Endurance

The number of times of folding endurance was measured for the films obtained using the above-described method under the conditions of: a folding angle of 135°, a folding speed of 175 cpm, and a measurement load of 9.8 N, using an MIT type folding endurance tester manufactured by Toyo Seiki Seisaku-sho, Ltd., in accordance with JIS P8115:2001. The measurement was ended when the number of times of folding endurance reached 10000.

(6) Puncture Impact Strength

The puncture impact strength was measured for the films obtained using the above-described method under the conditions of: a measurement sample fixing frame with an inner diameter of 50 mm, a punching striker diameter of 12.7 mm, and a test speed of 3 m/second in an environment at a temperature of 23° C. and an environment at a temperature of −20° C. using a high-speed puncture impact testing machine "Hydroshot HITS-P10" manufactured by SHIMADZU CORPORATION, with reference to JIS K7124-2:1999.

(7) Roller Contamination

After the extruder was operated for 1 hour in the production of the films, contamination of the casting roller due to deposition of low molecular weight components and the like was evaluated through visual observation.

(8) Thickness Accuracy

The thicknesses of the films obtained using the above-described method were measured in center portions in the width direction of the films at 30 points set at 10 mm intervals in the length direction (resin flowing direction MD) of the films using a micrometer having a resolution of 1 μm. Thickness accuracy was calculated using the following formula 1 from the average value and the standard deviation of the obtained measurement results.

Thickness accuracy (%)=standard deviation(μm)/ average value(μm)×100 [Formula 1]

(9) Surface Roughness (9-1) Arithmetic Mean Height (Sa) and Maximum Height (Sz)

Measurement was performed on the surfaces of the films that were brought into contact with the casting roller in the production of the films under the conditions of: an ocular lens magnification of ×1.0, an objective lens magnification of ×20, and a measurement area with a length of 235 μm and a width of 313 μm, using a white-light interference microscope "ContourGT-X" manufactured by Bruker Corporation, and the arithmetic mean height (Sa) and the maximum height (Sz) were calculated after smoothing processing was performed using a Gaussian function.

(9-2) Arithmetic Mean Roughness (Ra) and Maximum Height Roughness (Rz)

Measurement was performed on the surfaces of the films that were brought into contact with the casting roller in the production of the films, in the length direction (resin flowing direction) of the films under the conditions of: a probe distal end radius of 0.5 mm, a measurement length of 8.0 mm, a reference length of 8.0 mm, a cut-off value of 0.8 mm, and a measurement speed of 0.2 mm/second, using a contact-type surface roughness measurement device "Surf Coder ET4000A" manufactured by Kosaka Laboratory Ltd., and the arithmetic mean roughness (Ra) and the maximum height roughness (Rz) were calculated.

(10) Relative Crystallinity

The films obtained using the above-described method were heated at a heating rate of 10° C./minute using the differential scanning calorimeter "Pyris1 DSC" manufactured by PerkinElmer, Inc., and the relative crystallinity was calculated using the following formula 2 based on the heat quantity (J/g) of a crystal melting peak and the heat quantity (J/g) of a recrystallization peak, which were obtained while the films were heated.

Relative crystallinity (%)={1−(ΔHc/ΔHm)}×100 [Formula 2]

ΔHc: Heat quantity (J/g) of a recrystallization peak when the film was heated at the rate of 10° C./minute.

ΔHm: Heat quantity (J/g) of a crystal melting peak when the film was heated at the rate of 10° C./minute.

(11) Specific Gravity

The specific gravity was measured for the films obtained using the above-described method at a temperature of 23° C. in accordance with JIS K7112:1999 (D method).

(12) Heat Shrink Ratio

The heat shrink ratio was determined using the following formula 3 by marking lines at an interval of 100 mm in the transverse direction of the films, on test pieces having a size of 120 mm×120 mm cut out from the films obtained using the above-described method, leaving the test pieces in an environment at 200° C. for 10 minutes, and measuring the distance between the marked lines before and after the heating.

Heat shrink ratio (%)=[(distance between marked lines before heating−distance between marked lines after heating)/distance between marked lines before heating]×100 [Formula 3]

(13) Heat Shrinkage Stress

A strip-shaped test piece having a length of 10 mm and a width of 3 mm was cut out from each of the films obtained using the above-described method, one end of the test piece was set in the chuck of a load detector and the other end of the test piece was set in a fixing chuck, and the stress value at 145° C. was measured using a thermomechanical analyzer "TMA7100" manufactured by Hitachi High-Tech Science Corporation by heating the test piece at a heating rate of 5° C./minute from room temperature (23° C.) to 340° C. in a state where a load was not applied to the test piece. Measurement was performed for both the length direction and the transverse direction of the film, and the larger one of the measured stress values was taken to be the heat shrinkage stress (mN).

If the heat shrinkage stress measured using this method is a minus value, it means that heat shrinkage did not occur.

TABLE 1

|  |  |  | Ex. 1 | Ex. 2 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|
| Raw material | Mn |  | 24000 | 31000 | 17000 | 17000 | 17000 | 14000 | 25000 | 19000 |
|  | Mw |  | 87000 | 110000 | 52000 | 55000 | 62000 | 52000 | 100000 | 100000 |
|  | Mw/Mn |  | 3.6 | 3.5 | 3.1 | 3.2 | 3.6 | 3.7 | 4.0 | 5.3 |
|  | Tm | ° C. | 337 | 334 | 345 | 343 | 344 | 344 | 339 | 337 |
|  | ΔHm | J/g | 38 | 34 | 48 | 52 | 51 | 46 | 40 | 42 |
|  | Tc | ° C. | 293 | 285 | 306 | 306 | 305 | 306 | 295 | 289 |

TABLE 1-continued

|  |  |  | Ex. 1 | Ex. 2 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|
| Film | Tm | °C. | 337 | 334 | 345 | 343 | 344 | 344 | 339 | 337 |
|  | ΔHm | J/g | 38 | 34 | 48 | 52 | 51 | 46 | 40 | 42 |
|  | Tc | °C. | 293 | 285 | 306 | 306 | 305 | 306 | 295 | 289 |
|  | Number of Times of Folding Endurance | times | 10000 | 10000 | 3300 | 3000 | 3900 | 4900 | 10000 | 10000 |
|  | Puncture impact strength (23° C.) | J | 0.8 | 0.9 | 0.1 | 0.1 | 0.2 | 0.1 | 0.7 | 0.8 |
|  | Puncture impact strength (−20° C.) | J | 0.6 | 0.9 | 0.1 | 0.1 | 0.1 | 0.1 | 0.2 | 0.9 |
|  | Roller contamination | — | Low | Low | Low | Low | Low | High | Low | High |
|  | Thickness accuracy | % | 1.9 | 1.4 | — | — | — | — | — | — |
|  | Sa | μm | 0.036 | 0.020 | — | — | — | — | — | — |
|  | Sz | μm | 1.874 | 0.933 | — | — | — | — | — | — |
|  | Ra | μm | 0.096 | 0.038 | — | — | — | — | — | — |
|  | Rz | μm | 0.683 | 0.303 | — | — | — | — | — | — |
|  | Relative crystallinity | % | 100 | 100 | 100 | 100 | 100 | 100 | 100 | 100 |
|  | Specific gravity | — | 1.29 | 1.29 | 1.29 | 1.29 | 1.29 | 1.29 | 1.29 | 1.29 |
|  | Heat shrink ratio | % | 0.3 | 0.6 | — | — | — | — | — | — |
|  | Heat shrinkage stress | mN | (−9.1) | (−12.6) | — | — | — | — | — | — |

In Examples 1 and 2, the used resin components had a molecular weight distribution less than 4 and a mass average molecular weight of 63000 or more, and it was found that therefore, the degree of crystallinity was low even when the obtained films were completely crystallized, and durability (a number of times of folding endurance) and impact resistance (puncture impact strength) of the obtained films were high. Also, the molecular weight distribution was narrow and the percentage of low molecular weight components was low, and therefore, the degree of contamination of the casting roller was low.

On the other hand, in Comparative Examples 1 to 4, the used resin components had a mass average molecular weight less than 63000, and it was found that therefore, durability (a number of times of folding endurance) and impact resistance (puncture impact strength) were poor. Also, in Comparative Example 4, the degree of contamination of the casting roller was high.

In Comparative Example 5, the mass average molecular weight of the used resin component was 63000 or more, but the molecular weight distribution was wide, and therefore, impact resistance (puncture impact strength) at a low temperature was poor.

In Comparative Example 6, the molecular weight distribution was wide and the percentage of low molecular weight components was large, and it was found that therefore, the degree of contamination of the casting roller was high.

It was confirmed that the films of Examples and Comparative Examples were completely crystallized (relative crystallinity: 100%) because no peak for heat generation accompanying crystallization was observed in the temperature raising process of DSC.

Specific aspects of the present disclosure are described in the above Examples, but the above Examples are merely examples and should not be construed as limiting the present disclosure. Various alterations that are obvious to those skilled in the art are intended to be within the scope of the present disclosure.

REFERENCE SIGNS LIST

1 Die
2 Mouthpiece
3 Pressure roller
4 Casting roller
5 Film

The invention claimed is:

1. A multilayer body comprising:
a first layer comprising a resin containing polyaryletherketone as a main component, and a second layer comprising reinforcing fibers having a number average fiber length of 5 mm or more,
wherein the resin has a molecular weight distribution of 2 or more and less than 4 and a mass average molecular weight of 63000 or more.

2. The multilayer body according to claim 1,
wherein the polyaryletherketone comprises polyetheretherketone.

3. The multilayer body according to claim 1,
wherein a percentage of a content of the polyaryletherketone in the resin is more than 90 mass %.

4. The multilayer body according to claim 1,
wherein the resin has the mass average molecular weight of 150000 or less.

5. The multilayer body according to claim 1,
wherein the polyaryletherketone has the molecular weight distribution of 2 or more and less than 4 and the mass average molecular weight of 63000 or more.

6. The multilayer body according to claim 1,
wherein the polyaryletherketone has the mass average molecular weight of 150000 or less.

7. The multilayer body according to claim 1,
wherein the first layer has a crystal heat of fusion of 30 J/g or more and 45 J/g or less.

8. The multilayer body according to claim 1,
wherein the first layer has a number of times of folding endurance of 5000 or more when measured under conditions of: a thickness of 100 μm, a folding angle of 135°, a folding speed of 175 cpm, and a load of 9.8 N.

9. The multilayer body according to claim 1,
wherein a puncture impact strength of the first layer is 0.3 J or more when measured under conditions of: a thickness of 100 μm, 23° C., a fixing frame inner diameter of 50 mm, a punching striker diameter of 12.7 mm, and a test speed of 3 m/second.

10. The multilayer body according to claim 1,
wherein a puncture impact strength of the first layer is 0.3 J or more when measured under conditions of: a thickness of 100 μm, −20° C., a fixing frame inner diameter of 50 mm, a punching striker diameter of 12.7 mm, and a test speed of 3 m/second.

11. The multilayer body according to claim 1,
wherein the first layer has a thickness accuracy of 7% or less.

12. The multilayer body according to claim 1,
wherein at least one surface of the first layer has an arithmetic mean height of 0.001 to 1 μm.

13. The multilayer body according to claim 1,
wherein at least one surface of the first layer has a maximum height of 0.1 to 10 μm.

14. The multilayer body according to claim 1,
wherein at least one surface of the first layer has an arithmetic mean roughness of 0.005 to 1 μm.

15. The multilayer body according to claim 1,
wherein at least one surface of the first layer has a maximum height roughness of 0.05 to 5 μm.

16. The multilayer body according to claim 1,
wherein the first layer has a relative crystallinity of 50% or more.

17. The multilayer body according to claim 1,
wherein the first layer is a film.

18. A composite material obtained by molding the multilayer body according to claim 1.

19. The composite material according to claim 18,
wherein the composite material is a prepreg.

20. A mobile body comprising the composite material according to claim 18,
wherein the mobile body is an airplane, an automobile, a ship or a railroad vehicle.

21. A multilayer body comprising
a first layer comprising a resin containing polyaryletherketone as a main component, and a second layer comprising reinforcing fibers having a number average fiber length of 5 mm or more,
wherein the resin has a molecular weight distribution of 2 or more and less than 4 and a mass average molecular weight of 63000 or more, and
wherein the first layer is a plate-shaped member.

22. The multilayer body according to claim 21,
wherein the polyaryletherketone comprises polyetheretherketone.

23. The multilayer body according to claim 21,
wherein the plate-shaped member is a film.

24. A method for manufacturing the multilayer body according to claim 1, the method comprising:
preparing the resin having a molecular weight distribution of 2 or more and less than 4 and a mass average molecular weight of 63000 or more,
melt kneading the resin using an extruder; and
extruding the melted resin from a mouthpiece and cooling the melted resin using a casting roller to form the melted resin into a film,
wherein the film has a number of times of folding endurance of 5000 or more when measured under conditions of: a thickness of 100 μm, a folding angle of 135°, a folding speed of 175 cpm, and a load of 9.8 N, and
wherein a puncture impact strength of the film at 23° C. is 0.3 J or more and the puncture impact strength of the film at −20° C. is 0.3 J or more, and the puncture impact strengths being measured under conditions of: a thickness of 100 μm, a fixing frame inner diameter of 50 mm, a punching striker diameter of 12.7 mm, and a test speed of 3 m/second.

25. The method for manufacturing a multilayer body according to claim 24,
wherein the polyaryletherketone has the molecular weight distribution of 2 or more and less than 4 and the mass average molecular weight of 63000 or more.

* * * * *